United States Patent [19]

Schubert et al.

[11] Patent Number: 5,414,227
[45] Date of Patent: May 9, 1995

[54] STYLUS TILT DETECTION APPARATUS FOR COMMUNICATION WITH A REMOTE DIGITIZING DISPLAY

[75] Inventors: Karl D. Schubert, Rockville, Md.; Guy F. Verrier, Boca Raton, Fla.; Michael Gray, Annapolis, Md.

[73] Assignee: International Business Machines Corporation, Armonk, N.Y.

[21] Appl. No.: 55,472

[22] Filed: Apr. 29, 1993

[51] Int. Cl.⁶ .................... G08C 21/00; G09G 3/02
[52] U.S. Cl. ............................ 178/18; 178/19; 345/173; 345/179
[58] Field of Search .............. 178/18, 19; 345/173, 345/178, 179

[56] References Cited

U.S. PATENT DOCUMENTS

| | | | |
|---|---|---|---|
| 3,873,770 | 3/1975 | Ioannou | 178/18 |
| 4,575,581 | 3/1986 | Langberg | 178/18 |
| 4,577,057 | 3/1986 | Blesser | 178/19 |
| 4,603,231 | 7/1986 | Reiffel et al. | 178/19 |
| 4,638,119 | 1/1987 | Blesser et al. | 178/19 |
| 4,686,332 | 8/1987 | Greanias et al. | 178/18 |
| 4,786,764 | 11/1988 | Padula et al. | 178/18 |
| 4,831,566 | 5/1989 | Mathews et al. | 178/19 |
| 5,007,085 | 4/1991 | Greanias et al. | 178/18 |
| 5,117,071 | 5/1992 | Greanias et al. | 178/19 |
| 5,136,125 | 8/1992 | Russell | 178/19 |
| 5,149,919 | 9/1992 | Greanias et al. | 345/179 |
| 5,198,623 | 3/1993 | Landmeier | 178/19 |
| 5,239,489 | 8/1993 | Russell | 178/18 |

*Primary Examiner*—Stephen Chin
*Assistant Examiner*—Vijay Shankar
*Attorney, Agent, or Firm*—George E. Grosser; John E. Hoel

[57] ABSTRACT

An architecture is disclosed for improved tilt detection for a radiative pickup stylus. The architecture includes a contact sensing mechanism and a coaxial conductor assembly which provides both position measurement and tilt sensing measurement features. By using the contact sensor to establish a calibration for the position and tilt detection elements, an improved, highly accurate position and tilt sensing capability is provided for radiative pickup stylus for a digitizing display.

10 Claims, 14 Drawing Sheets

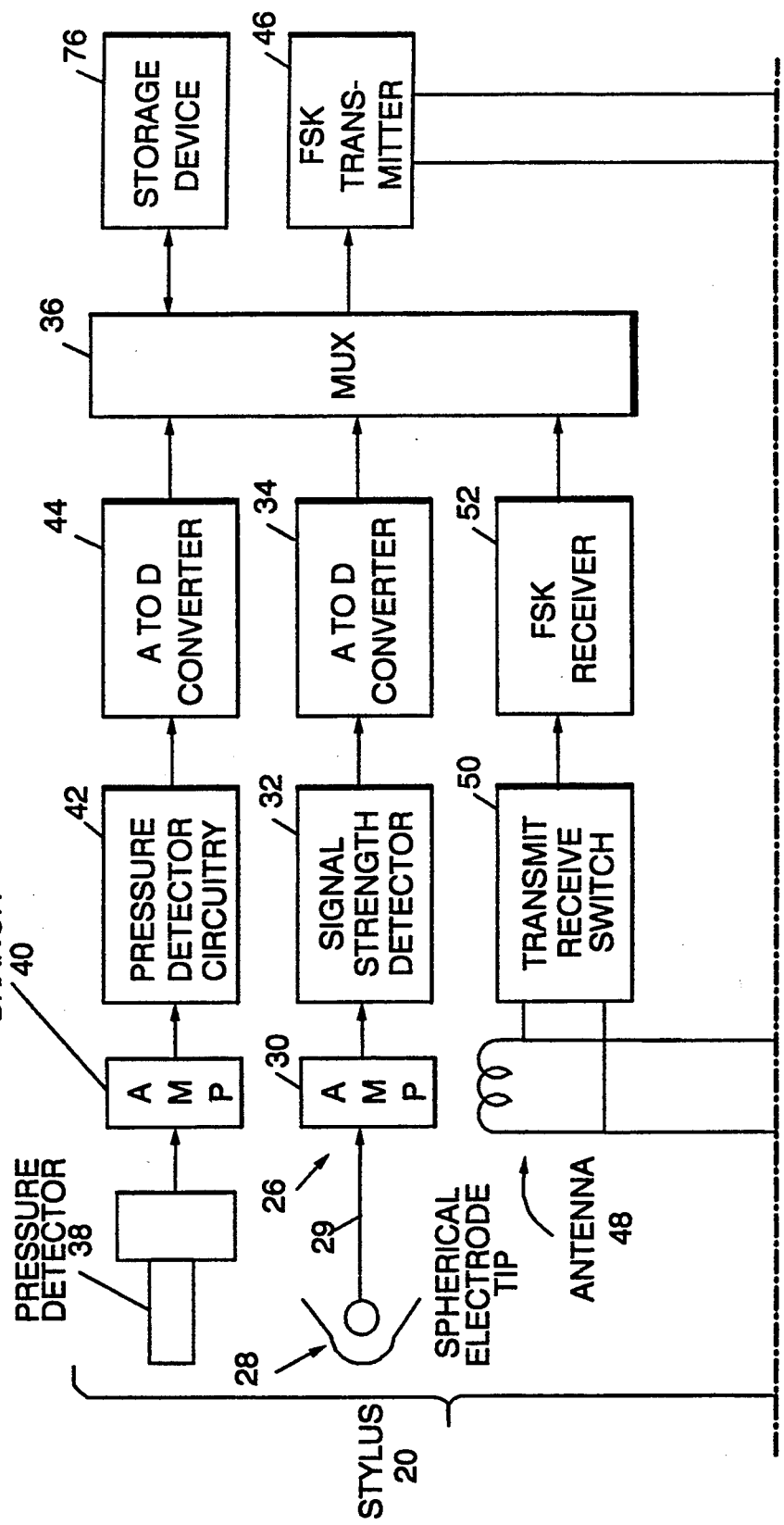

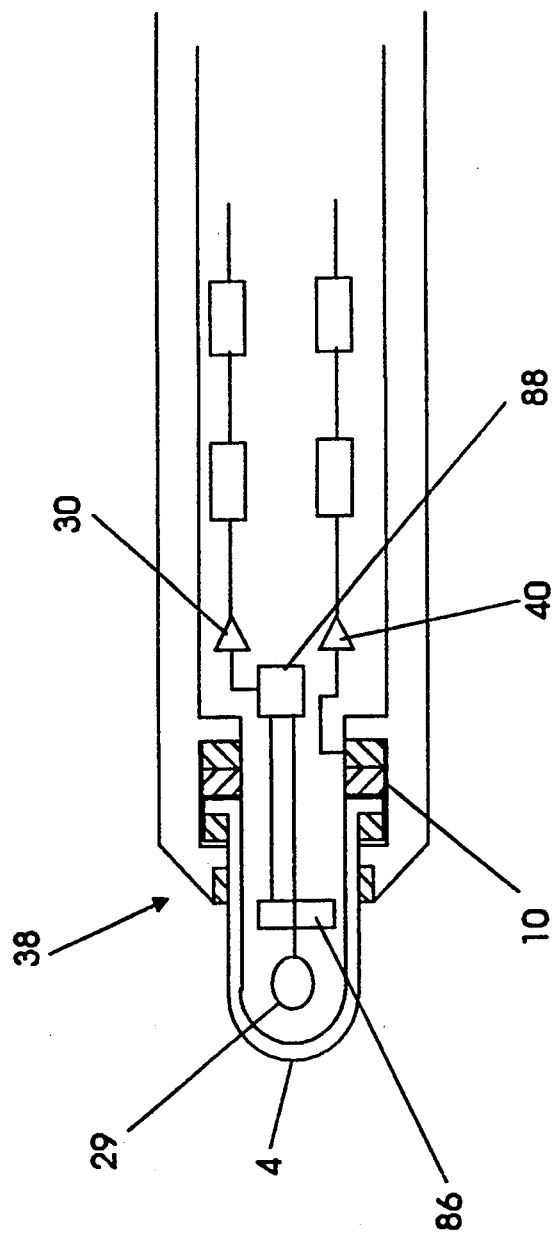

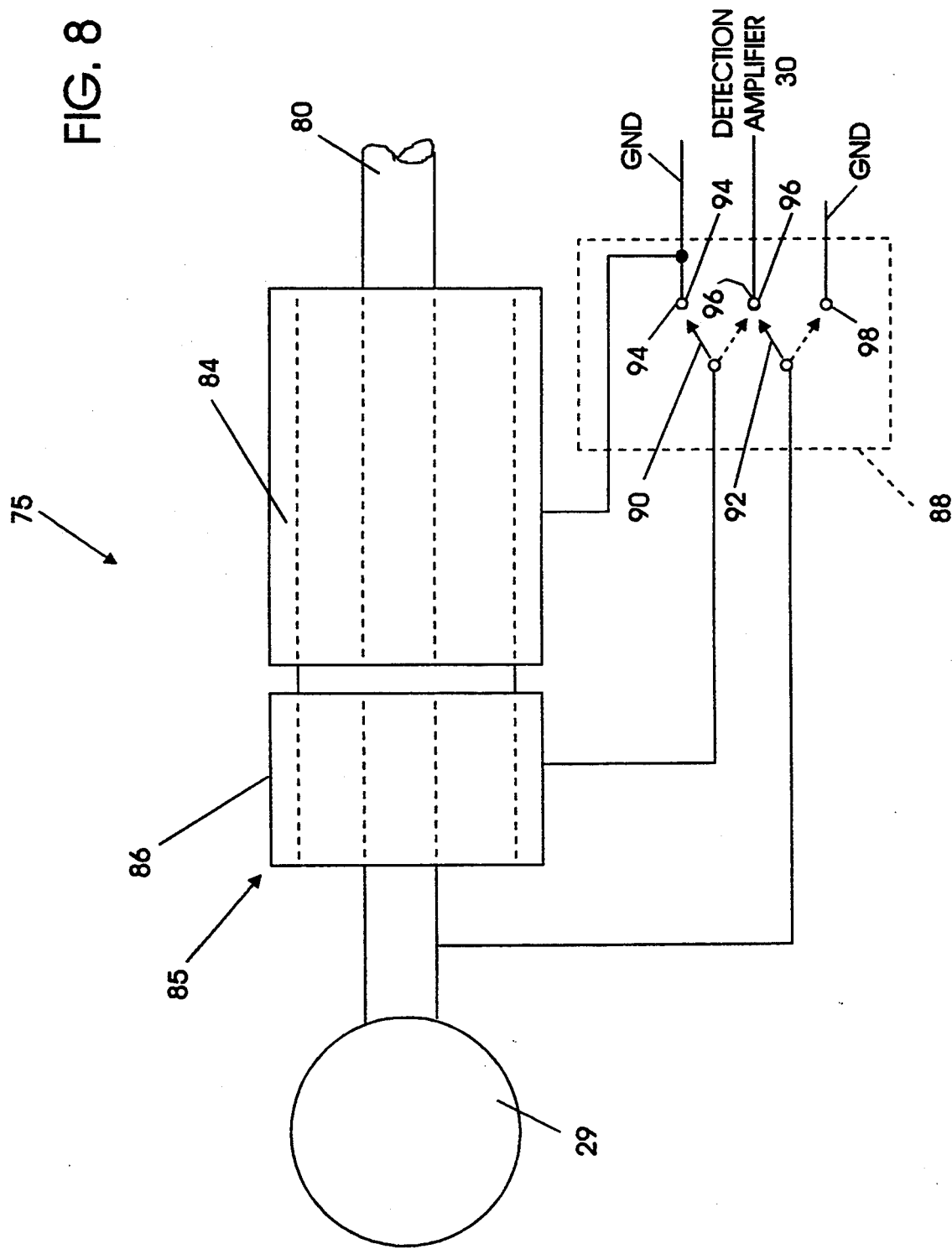

STYLUS TILT DETECTION APPARATUS FOR COMMUNICATION WITH A REMOTE DIGITIZING DISPLAY

BACKGROUND OF THE INVENTION

1. Technical Field

The invention disclosed broadly relates to data processing systems and more particularly relates to improvements in input/output devices for pen-based computer systems.

2. Related Patents and Patent Applications

The following patents and patent applications are assigned to the IBM Corporation and are incorporated herein by reference.

U.S. Pat. No. 4,686,332 entitled "Combined Finger Touch and Stylus Detection System for Use on the Viewing Surface on a Visual Display Device," by Evon C. Greanias, et al.

U.S. Pat. No. 5,007,085 entitled "Remotely Sensed Personal Stylus," by Evon C. Greanias, et al.

U.S. Pat. No. 5,117,071 entitled "Stylus Sensing System," by Evon C. Greanias, et al.

Copending U.S. patent application Ser. No. 07/778,431, filed Oct. 16, 1991, entitled "Touch Overlay for Improved Touch Sensitivity," by Evon C. Greanias, et al.

Copending U.S. patent application Ser. No. 07/351,227, filed May 15, 1989, entitled "Flat Touch Screen Workpad for a Data Processing System," by Gordon W. Arbeitman, et al.

Copending U.S. patent application Ser. No. 07/969,864, filed Oct. 30, 1992, entitled "Architecture for Communication of Remote Devices to a Digitizing Display," by Guy F. Verrier, et al.

3. Background Art

Pen-based computer systems have been described in the prior art, for example in the above referenced U.S. Pat. No. 4,686,332 by Greanias, et al. In that system, a touch overlay membrane is positioned over the viewing surface of a display device such as a computer monitor, for interacting with a pickup stylus. The pickup stylus described in the '332 patent is connected by means of a wire to the pen-based computer system. The pen-based computer system generates a radiative signal in the touch overlay. The radiative signal is picked up by the stylus and sent back over the wire to the pen-based computer. The computer then calculates the relative X-Y position of the stylus with respect to the overlay. The relative proximity Z of the stylus to the overlay is determined by the signal amplitude picked up by the stylus from the electromagnetic energy radiated from the overlay. An improvement in the stylus pickup antenna is described in the above cited U.S. Pat. No. 5,117,071 by Greanias, et l. In the '071 patent, the antenna configuration in the tip of the stylus is a small sphere, whose shape enables a uniform signal strength to be picked up without regard for the relative orientation of the stylus with respect to the planar surface of the overlay. A further improvement has been made to the stylus by eliminating the cable connection between the stylus and the pen-based computer system, as is described in U.S. Pat. No. 5,007,085 by Greanias, et al. In the '085 patent, the signal detected by the stylus antenna which has been picked up from the electromagnetic radiation emitted by the overlay, is converted into a second signal which is transmitted either by infrared radiation, microwave radiation or radio frequency radiation at a different frequency, from the stylus back to an electromagnetic detector coupled to the pen-based computer system. Another improvement to pen-based computer systems is described in the above referenced copending U.S. patent application Ser. No. 07/351,227, filed May 15, 1989 by Arbeitman, et al. In the Arbeitman, et al. patent application, a flat touch screen workpad is substituted for the combination of the computer display monitor and touch overlay membrane. In the Arbeitman, et al. patent application, the radiative pickup stylus is connected by means of a wire to the flat touch screen workpad, for receiving the electromagnetic radiation emanated from the overlay membrane, the wire transferring the detected signal from the pickup stylus back to the electronics contained in the flat touch screen workpad.

In the description of the invention contained herein, the term "digitizing display" will be used to generally refer to either the combination of a computer display monitor and touch overlay membrane described in the '085 patent or alternately, the workpad display and overlay described in the Arbeitman, et al. patent application.

The above cited U.S. Pat. No. 5,007,085 entitled "Remotely Sensed Personal Stylus," by Evon C. Greanias, et al., describes a pen-based computer system which has a digitizing display which radiates electromagnetic signals which are picked up by a remotely sensing personal stylus. The antenna in the tip of the stylus picks up the electromagnetic signals radiated from the display overlay, and converts those signals into a suitable form for retransmission back to the pen-based computer system. The relative signal strength of the signals picked up by the stylus is used to infer the relative separation distance Z of the tip of the stylus with respect to the overlay. The converted signals are transmitted back to the pen-based computer system by means of a transmitting circuit and transmitting antenna within the stylus. The technique for determining contact between the stylus tip and the surface of the overlay, is by measuring the relative signal strength of the electromagnetic signal picked up by the tip of the stylus.

A problem with this prior art is that the detection of actual touchdown of the stylus onto the workpad surface is not very sensitive. Consider in normal handwriting how the writer's hand pressure varies during the course of writing a signature. The pressure applied by the pen to the paper varies over the course of inscribing the signature on the paper and sometimes includes a slight raising of the pen from the surface of the paper. The process of writing a signature on a digitizing display by means of a radiative pickup stylus, does not faithfully reproduce the intended shape on the display screen. When the stylus is raised slightly from the surface of the digitizing display, the separation of the stylus tip from the surface will not be detected in prior art systems. What results is spurious traces and artifacts which remain in the "inked" depiction of the user's signature because the system cannot detect the actual small separation of the stylus from the surface of the digitizing display. This problem has been solved by the above cited copending application Ser. No. 07/969,864 by Guy Verrier, et al.

Prior art stylus configurations are suitable for determining the linear displacement between the tip and the digitizing display surface, however for those applications such as signature validation, calligraphy such as Kanji Japanese character writing, and other applications where the angle of the stylus becomes important, prior art stylus structures are not adequate to provide the tilt information necessary.

OBJECTS OF THE INVENTION

It is therefore an object of the invention to improve the accuracy of representing handwritten characters and script in a pen-based computer system.

It is another object of the invention to more accurately detect the tilt orientation of a stylus with respect to the surface of a workpad in a pen-based computer systems.

It is a further object of the invention to provide a data processing architecture for transferring digital information between a stylus and a pen-based computer system.

It is yet another object of the invention to provide a data processing system for communicating contact and tilt information between a stylus and a pen-based computer system.

It is still another object of the invention to provide an improved technique for determining the tilt orientation of a stylus with respect to the plane of the digitizing display.

SUMMARY OF THE INVENTION

These and other objects, features and advantages are accomplished by the stylus tilt detection apparatus for communication with the remote digitizing display. A radiative pickup stylus for a digitizing display is disclosed, having a tilt orientation sensitivity. The assembly includes a stylus housing having a hollow tip portion for mechanically supporting a coaxial conductor assembly. A coaxial conductor assembly is mounted in the tip of the housing, having a central conductor surrounded by an insulating sleeve with an external cylindrical surface. The central conductor has an end extending axially beyond a terminating surface of the sleeve. The coaxial conductor assembly includes a first hollow, cylindrical conductor portion supported on the external surface of the insulating sleeve and electrically connected to a reference potential. The coaxial conductor assembly further includes a second hollow, cylindrical conductor portion supported on the external surface of the insulating sleeve and in spaced relation with the first hollow, cylindrical conductor. The second hollow, cylindrical conductor is nearer to the terminating surface of the sleeve than is the first hollow, cylindrical conductor. The coaxial conductor assembly further includes a spherical terminating electrode mounted to the end of the central conductor and in spaced relation to the second hollow, cylindrical conductor.

In a first detection state, the second hollow, cylindrical conductor is selectively connected to the reference potential and the spherical terminal electrode is correspondingly connected to a radiative field detector, to measure a first distance of the spherical terminal electrode from the plane of the digitizing display while it radiates an electromagnetic signal. In a second detection state, the second hollow, cylindrical conductor is connected to the radiative field detector and the spherical terminal electrode is connected to the reference potential, to measure a tilt orientation value of the coaxial conductor assembly with respect to the plane of the digitizing display. In this manner, a tilt orientation for the radiative pickup stylus can be measured in an improved manner.

Further in accordance with the invention, the coaxial conductor assembly is mounted within a contact detection mechanism which uses a pressure transducer to detect an unambiguous contact between the stylus and the plane of the digitizing display. Calibration adjustments for the relative signal strength detected by the spherical terminal electrode and the second hollow, cylindrical conductor when the mechanical contact is detected by the contact detection mechanism, provide accurate tip location and tilt orientation measurements for the stylus at other locations with respect to the plane of the digitizing display.

DESCRIPTION OF THE DRAWINGS

These and other objects, features and advantages will be more fully appreciated with reference to the accompanying figures.

FIG. 2B is a more detailed mechanical side view of the stylus of FIG. 2A.

FIG. 5 is a top view and FIG. 6 is a side view of the workpad 22.

FIG. 8 is a side view of the coaxial conductor assembly, including an electrical schematic diagram showing the switch 88.

DISCUSSION OF THE PREFERRED EMBODIMENT

Figures 1, 2:
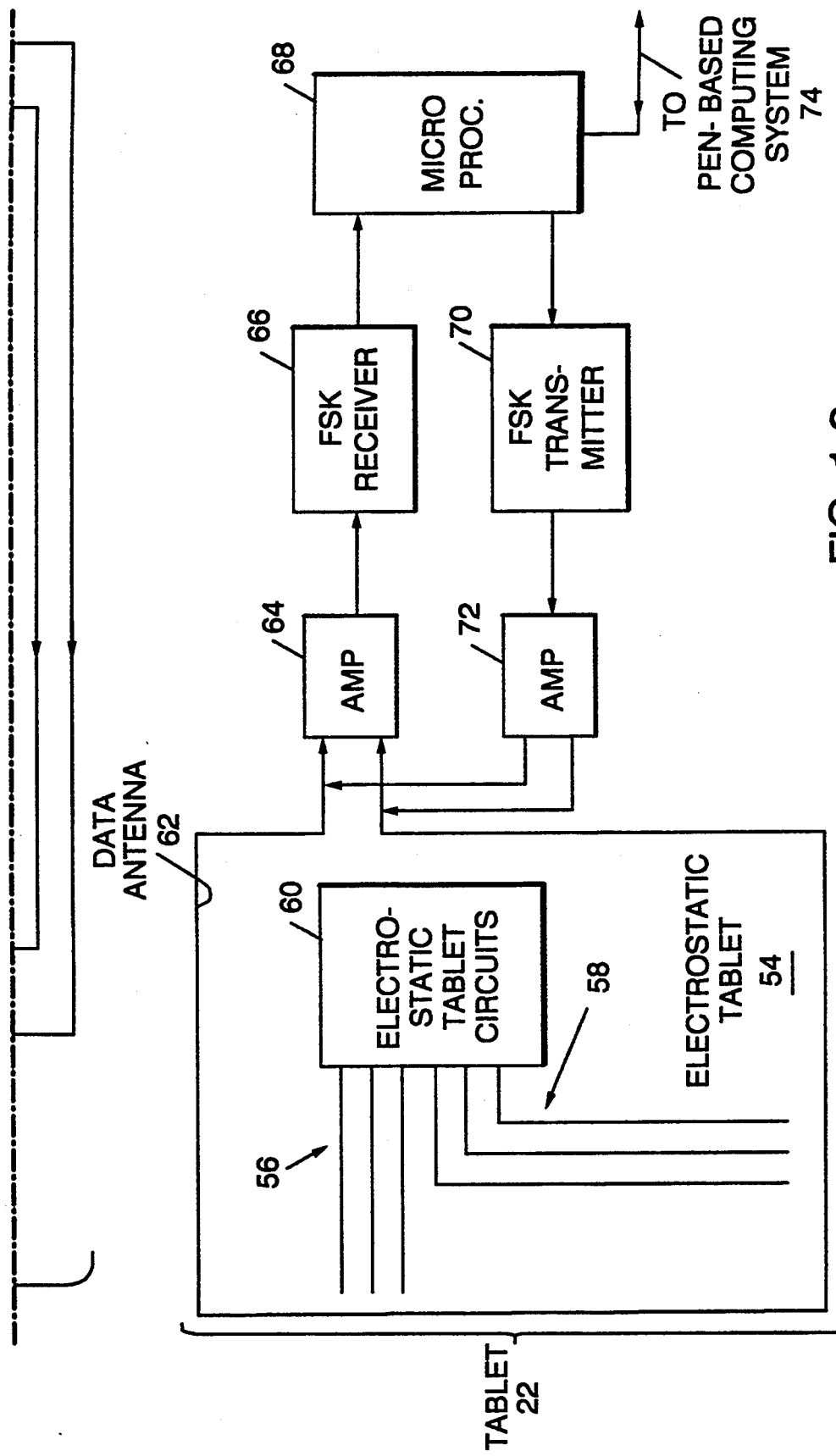
FIG. 1 is an overall architectural diagram of the invention.

FIG. 1 is an overall architectural diagram of the architecture for communications of remote devices to a digitizing display. The digitizing display which is described herein is described in greater detail in the commonly assigned U.S. Pat. No. 5,007,085 by Greanias entitled "Remotely Sensed Personal Stylus" and U.S. Pat. No. 4,764,885 by Greanias entitled "Proximity Sensing Blinking Cursor Feature " and U.S. Pat. No.

4,686,332 by Greanias entitled "Thin Plastic Overlay for Finger and Stylus Display Input."

Figure 1B:
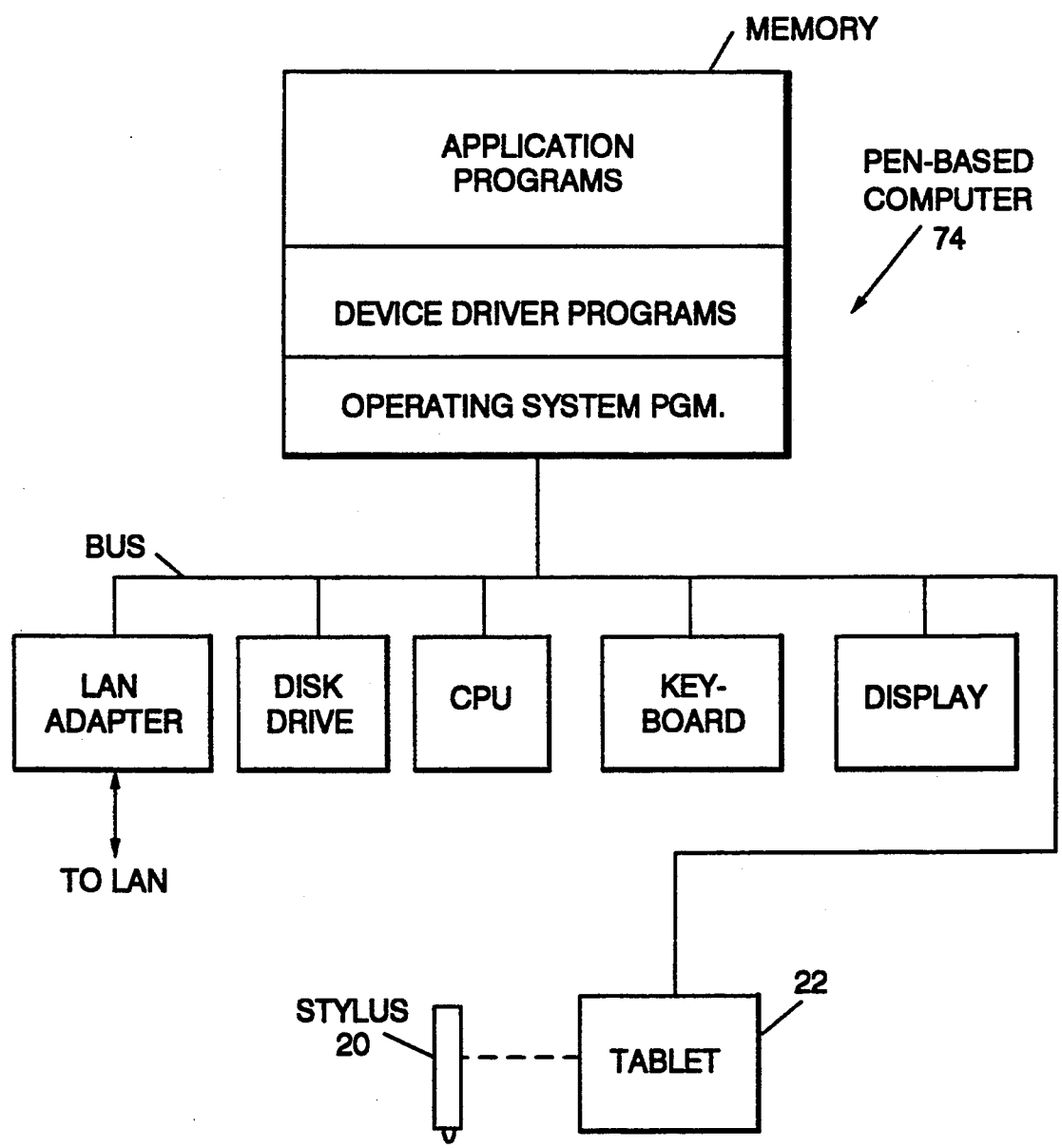
FIG. 1B shows the pen-based computer system.

FIG. 1B shows the pen-based computer system that includes the personal computer 74, the digitizing display or workpad tablet 22 and the stylus 20. The personal computer 74 includes a memory coupled by a system bus to a central processing unit (CPU), a keyboard, a display monitor, a disk drive bulk storage, a local area network (LAN) adapter and the tablet 22. The memory of the personal computer 74 stores an operating system program, device driver programs and application programs which are sequences of executable instructions that are executed in the CPU. The LAN adapter of the personal computer 74 connects to a local area network (LAN) that can connect the personal computer 74 to other computers and other networks. The stylus 20 communicates with the tablet 22 by means of an electromagnetic link that can be frequency modulated radio signals, amplitude modulated radio, or modulated optical or infrared radiation signals.

The architecture shown in FIG. 1 is divided in two principal parts. The first part is the stylus 20 and the second part is the tablet or digitizing display 22. The stylus 20 includes a first branch which can be for example branch 24 which is a mechanical contact detecting branch. The second branch can be for example branch 26 which is a position detecting branch.

Figure 2A:
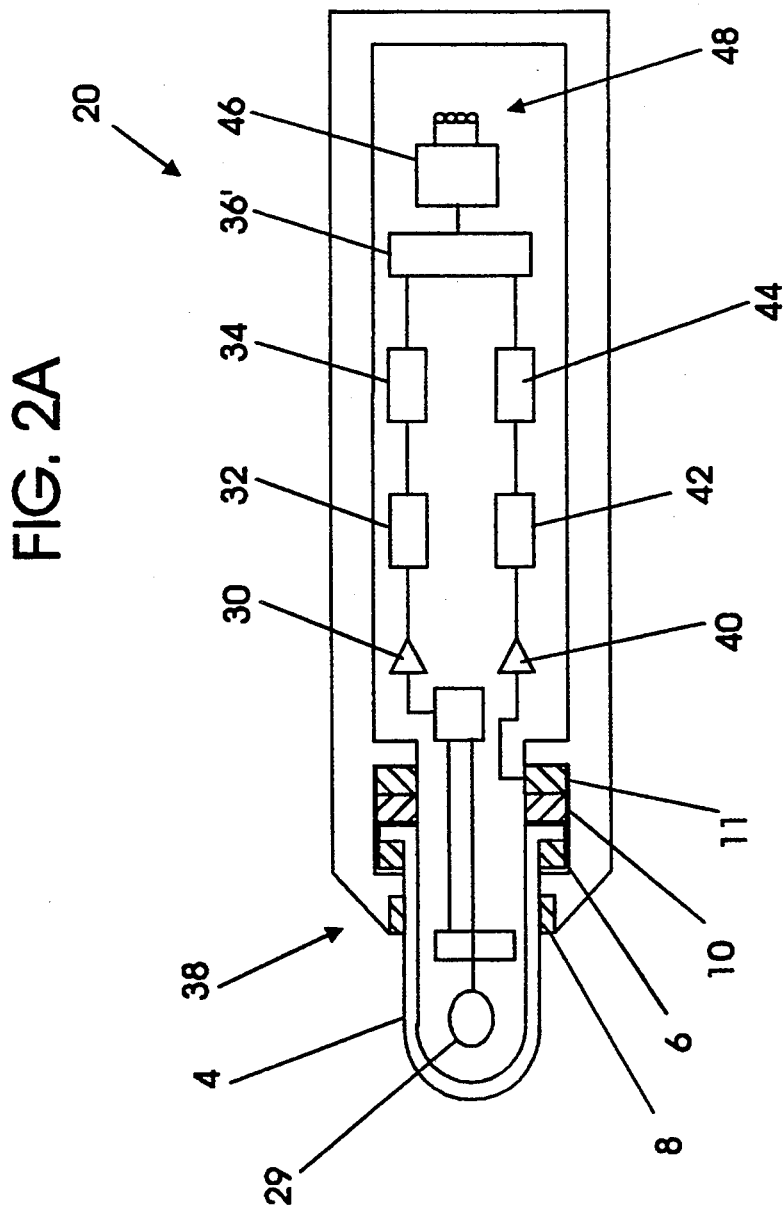
FIG. 2A is a mechanical side view of an example stylus which includes a pressure-sensing mechanism in one end thereof for picking up the pressure applied by the stylus to the surface of a digitizing display.

The contact detecting branch 24 can include a pressure detector 38, which is shown in greater detail in FIGS. 2A and 2B. Connected to the pressure detector 38 is a signal amplifier 40 which has its output connected to the pressure detector circuitry 42. The output of pressure detector circuitry 42 goes to the analog-to-digital converter 44 which outputs a digital number representing the pressure applied by the pressure detecting mechanism 38 to the front surface of the electrostatic tablet 54 in FIG. 1. The output of the analog-to-digital converter 44 is then applied to a first input of the multiplexer 36.

FIGS. 2A and 2B show the stylus 20 and in particular, show the details of the mechanical contacting mechanism 38. A pressure transducer 10 includes a layer formed of a force sensitive resistant (FSR) transducer material, for example, as manufactured by Interlink Electronics, Santa Barbara, Calif. Such material changes its resistance when compressed by the application of a force on its surface. Electrically conductive electrodes on the printed circuit board 11 contact separated portions of the surface of the FSR transducer layer 10 such that a complete circuit is formed between the conductors on the printed circuit board 11, by way of the FSR transducer layer 10. The electrodes on the printed circuit board 11 are pressed against the transducer 10 to complete the electrical circuit.

When the operational amplifier 40 shown in FIG. 1 is turned on but the stylus 20 is not yet in use, a voltage will be applied across the FSR transducer 10 by way of the stylus terminals and conductive electrodes 11. Then, when the tip 4 of the stylus 20 is pressed against the tablet surface 54, the FSR transducer layer 10 is compressed between the surfaces of two opposing parts. The first part is displaceable as the stylus tip 4, which is slightly displaced when pressure is exerted on the stylus tip 4. The other part of the compression mechanism is stationary and is the printed circuit board 11 which is held in place by the housing 2 shown in FIG. 2. When the FSR transducer layer 10 is compressed, its electrical resistance changes such that a current and/or voltage change is produced at the output connected to the operational amplifier 40. This change is used to trigger the pressure detector 42, to acquire the pressure sensing data. Also included within the hollow tip 4 of the stylus 20 of FIG. 2, is the pickup antenna 29 shown in FIG. 1, which is radiatively coupled to the radiating electrodes 56 and 58 of the tablet 54.

In the position detecting branch 26 is the antenna device 29 described in U.S. Pat. No. 5,117,071 cited above, which picks up electromagnetic signals radiated from the conductors 56 and 58 in the electrostatic tablet 54. The output of the antenna 29 is coupled through the amplifier 30 to the signal strength detector 32. The output of the signal strength detector 32 is then applied to the analog-to-digital converter 34. The output to the analog-to-digital converter 34 is a digital representation of the signal strength detected by the antenna 29 for the signals radiated from the conductors 56 and 58 in the electrostatic tablet 54. The signals radiated from the electrostatic tablet 54 represent positional information when detected by the antenna 29, as described in U.S. Pat. No. 5,686,332, cited above.

The output of the signal strength detector 32 is applied to the analog-digital converter 34, which in turn outputs a digital representation of the relative position of the stylus 20 over the electrostatic tablet 54, as a number to a second input to the multiplexer 36.

Figure 3:
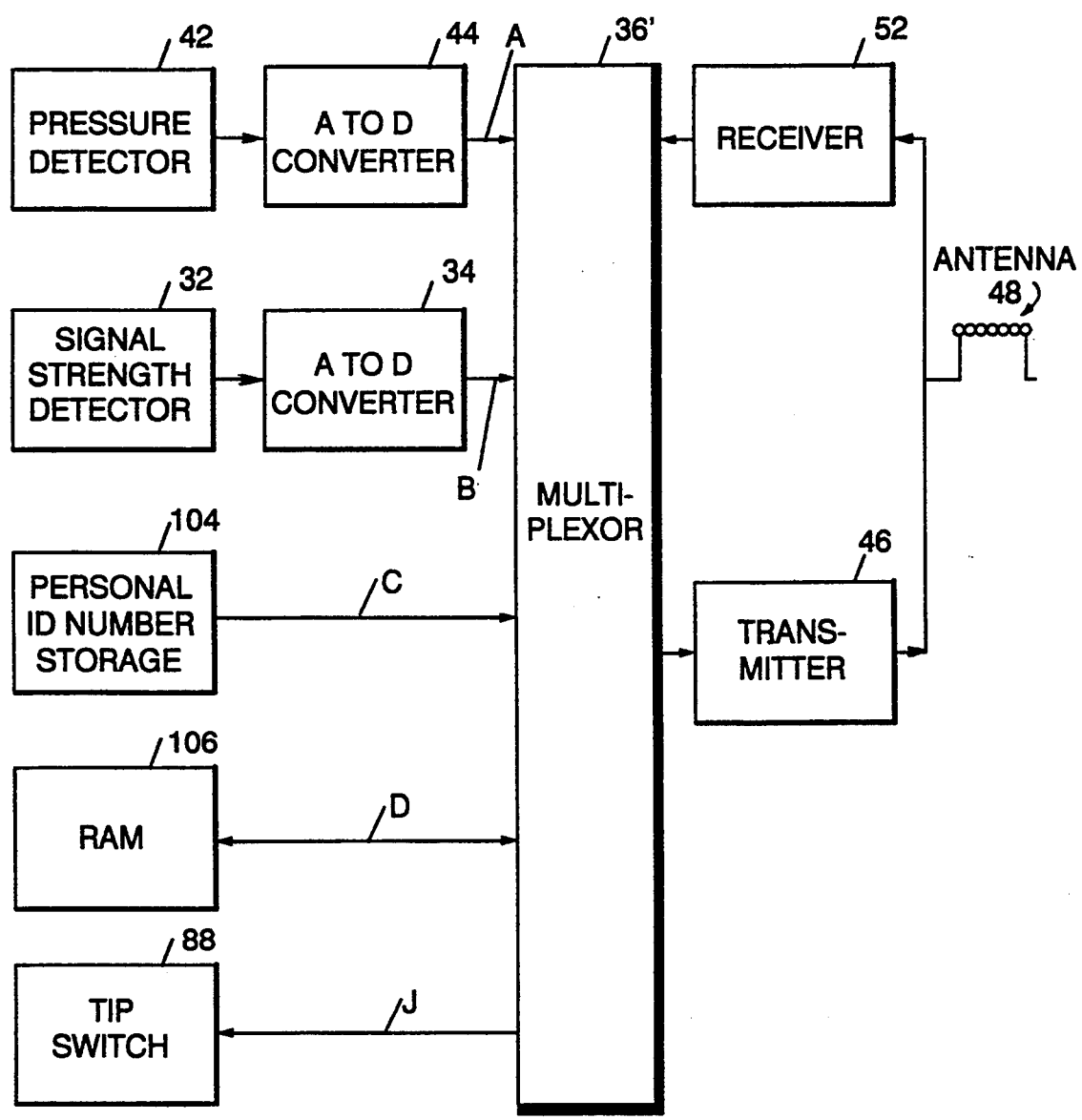
FIG. 3 is a schematic block diagram of an example plurality of sources of digital information which can be multiplexed and transmitted from the stylus to an antenna embedded in an associated digitizing display.
Figure 4:
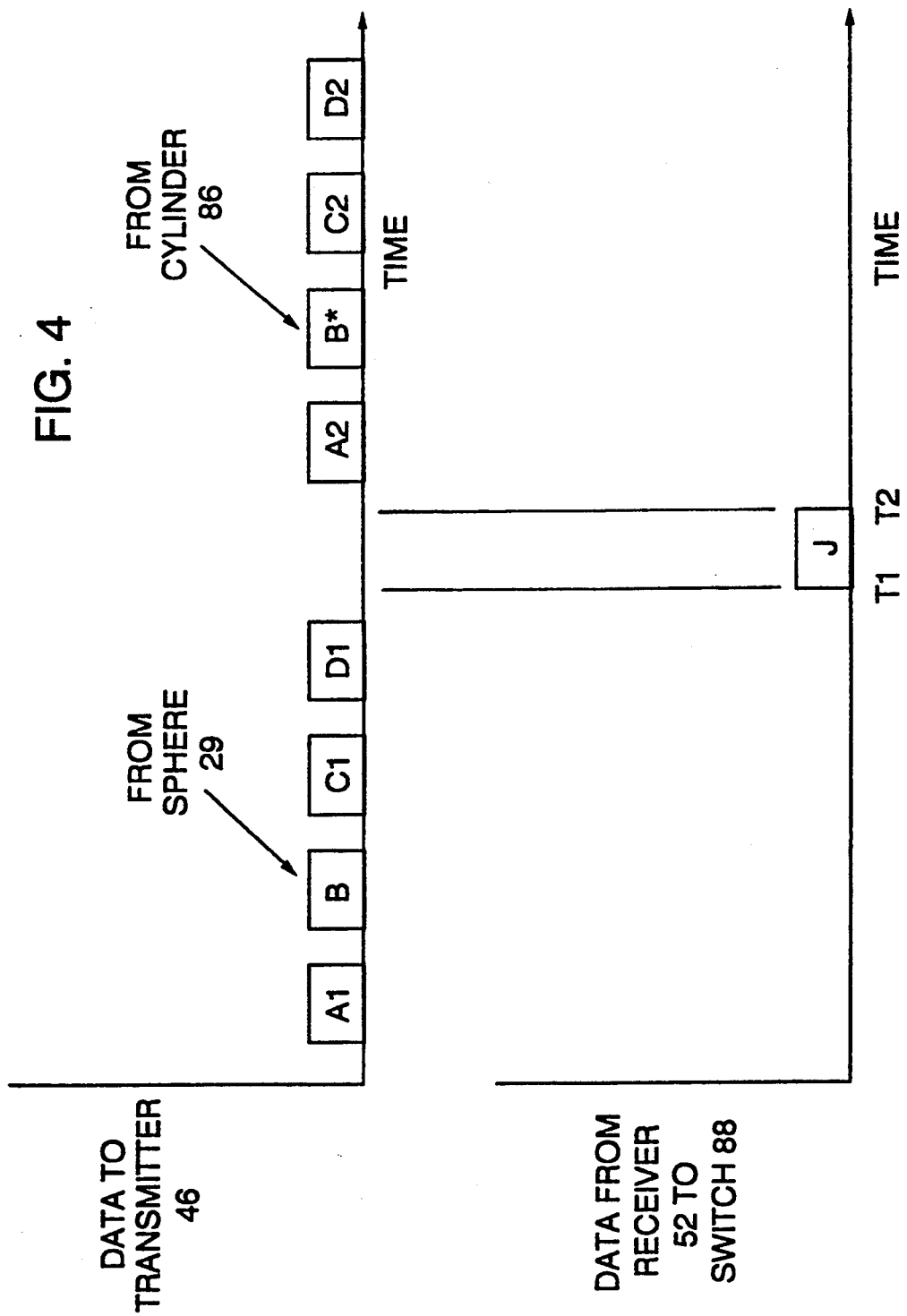
FIG. 4 is a waveform diagram of the output from multiplexer 36' to the transmitter 46 in FIG. 3.

The multiplexer 36 is shown as multiplexer 36' in the schematic diagram in FIG. 3. There it is seen that the multiplexer 36 or 36' generates a time-divided sequence of numbers in data frames as shown in FIG. 4, which are applied to the transmitter 46. The multiplexer can be controlled to change the order and content of the data stream. Returning to FIG. 1, the multiplexed data stream of numbers alternately output from the pressure detector A-to-D converter 44 and the position detecting A-to-D converter 34 are applied to the frequency shift key (FSK) transmitter 46. The output of the transmitter 46 is then applied to the antenna 48 in the stylus 20. The stylus 20 then radiates the information which includes the applied pressure on the pressure detecting mechanism 38 and the X-Y position information from the antenna device 29. This data stream is radiated from the antenna 48 and is detected, in accordance with the invention, by the embedded antenna 62 in the tablet or digitizing display 22.

FIGS. 2A and 2B also show the hollow, cylindrical conductor 86 which is shown in spaced relation to the spherical terminal electrode 29 inside the tip housing 4. The cylindrical conductor 86 is shown electrically connected to the tip switch 88 which also receives an electrical connection from the spherical electrode tip 29. The output of the tip switch 88 is then connected to the input of the amplifier 30. In accordance with the invention, selected combinations of the radiative detection by the spherical tip 29 and the cylindrical conductor 86, as switched through the tip switch 88, provide both linear displacement measurement and relative tilt orientation measurement for the stylus 20 with respect to the plane of the digitizing display 54.

FIG. 3 shows the multiplexer 36', which can replace the multiplexer 36 in FIG. 1. The multiplexer 36' in FIG. 3 has four input devices connected to it, the pressure detector 42, the signal strength detector 32, the personal identification number storage 104, and the RAM 106. The pressure detector 42 transfers the applied pressure signal input from the tip 4 of stylus 20 to the analog-to-digital converter 44, which outputs a digital representation of the applied pressure on input A to the multiplexer 36'. The signal strength detector 32 receives X-Y related position information and Z separation information from the antenna 29 and applies it to the analog-to-digital converter 34. The converter 34 outputs a digital representation of the X-Y position and Z separation over the input B to the multiplexer 36'. The signal strength detector 32 receives its signal from the amplifier 30, which in turn receives its signal from the output of the tip switch 88. The tip switch 88 is connected both to the antenna spherical electrode 29 and also to the cylindrical conductor 86 as shown in FIG. 8. The signal strength detector of FIG. 3 receives the X-Y related position information and Z separation information from the cylindrical conductor 86 and applies it to the analog-to-digital converter 34. The converter 34 outputs a digital representation of the X-Y position and Z separation for the cylindrical conductor 86 with respect to the plane of the digitizing display 54, over the input B to the multiplexer 36'. Whether the cylindrical conductor 36 or alternately the spherical terminal 29 are connected to the amplifier 30, is a function of the detection state determined by the switch 88. The output J from the multiplexer 36' to the tip switch 88, provides the selective switching between connecting the spherical terminal element 29 or alternately the cylindrical conductor element 86 to the amplifier 30. The personal identification number storage 104 can be a read-only storage or a writable EPROM which outputs an identifying digital number on the input C to the multiplexer 36'. The RAM 106 can store information which is output as digital information to the input D to the multiplexer 36'.

FIG. 4 shows a waveform diagram of the multiplexed data stream output from the multiplexer 36' of FIG. 3 to the transmitter 46 for transmission over the antenna 48 in the stylus 20. The waveform diagram of FIG. 4 shows the multiplexed outputs A1, B, C1 and D1 during a first time frame, which are respectively output over the lines A, B, C and D to the multiplexer 36' of FIG. 3. The waveform diagram of FIG. 4 also shows a second time frame during which a similar sequence of data words A2, B*, C2 and D2 are respectively output on the inputs A, B, C and D in FIG. 3.

The digitizing display 22 can be, for example, a transparent overlay superimposed on a conventional display monitor or a workpad coupled to a pen-based computer system. Included in the overlay, for example, can be the embedded antenna 62. Alternately, the antenna 62 can be proximate to the transparent overlay, but sufficiently close to enable detection of the multiplexed data stream transmitted from the antenna 48 of the stylus 20.

The stylus 20 transmits by means of the antenna 48 information from the pressure detector 38 and the X-Y detector 29 to the antenna 62 in the digitizing display 22. Antenna 62 in the digitizing display 22, is coupled through the amplifier 64 to the FSK receiver 66. The output of the receiver 66 is then applied to a microprocessor 68. The microprocessor 68 can, for example, strip out the respective numbers representing the contact pressure detected by the detector 38 in the stylus 20 and separately, the number representing the X-Y position location of the stylus with respect to the electrostatic tablet 54. The numerical values can then be forwarded by the microprocessor 68 to the pen-based computing system 74.

Further, the stylus 20 can include a transmit/receive switch 50 which alternately connects the antenna 48 to either the FSK transmitter 46 or alternately to the FSK receiver 52 in the stylus 20. If the receiver 52 is connected to the antenna 48, the the stylus 20 can receive information in the form of electromagnetic signals radiated from the antenna 62 in the digitizing display 22. In this mode of operation, the FSK transmitter 70 transfers digital information from the microprocessor 68 to the amplifier 72, which applies the digital information over the antenna 62 of the digitizing display 22. The radiated electromagnetic signals from the antenna 62 containing the digital information from the microprocessor 68, is radiated to the antenna 48 in the stylus 20. The antenna 48 is then connected through the transmit/receive switch 50 to the FSK receiver 52, which applies the received digital information from the digitizing display 22 to the multiplexer 36. The multiplexer 36 will then apply the digital information to for example a storage device 76 in the stylus 20 or the RAM 106 in FIG. 3. In this manner, digital information can be transmitted from the tablet or digitizing display 22 and received and stored in the stylus 20.

The side cross-sectional view of the stylus 20 shown in FIG. 2A and in FIG. 2B provides a detailed illustration of the mechanical parts of the pressure contacting portion 38. The stylus 20 is designed to precisely determine when the tip 4 is in mechanical contact with the electrostatic tablet 54 and when it is not in mechanical contact. However, the tip contacting portion 38 can also output several intermediate states of pressure. For example, the contact portion 38 of the stylus 20 can output 16 levels represented by four binary bits of pressure. The 16 levels of pressure can be used for applications such as shading of drawings, moving a cursor fast or slow, drawing heavy or light lines, and other drawing applications. The construction of the stylus 20 shown in FIG. 2A and FIG. 2B enables very small longitudinal displacement of the probe tip 4 within the housing 2 to detect a range of force from 30 grams to 300 grams. The stylus 20 can use a transducing material such as the force sensing resistor made by Interlink, described above.

The design of the contact portion 38 shown in FIG. 2A eliminates friction which would prevent the detection of low pressure. It also allows the stylus to relax back to its non-contact state, to avoid confusing readings when detecting the tip 4 is just coming off the surface of the display 54. The design shown in FIG. 2A also provides a very low pre-load pressure on the force sensing resistor 10 so that the dynamic range of the force sensing resistor 10 is maximized. In addition, the design of the contact portion 38 in FIG. 2A minimizes the detection of lateral rather than axial or longitudinal forces.

The tip 4 of FIG. 2A floats freely between the cone 3 and a brass shaft which holds the ball of the electrostatic sensor 29, as described in the above referenced U.S. Pat. No. 5,117,071. Bushings 8 and 9 are made of tetrafluoroethylene to minimize friction.

The gasket 6 is made of very low durometer rubber to establish a minimum amount of pre-load pressure. Without some pre-load pressure, the tip 4 will move around inside the cone 3 and create false readings as the stylus 20 is moved, rotated, shaken or tilted. However, if the gasket 6 is too stiff, this will reduce the sensitivity of the stylus to the detection of low forces and reduce the dynamic range of the stylus.

The tip 4 detects axial forces, along the line of the axis of the housing 2. The pen tip 4 contains the electrostatic sensing element 29 used for X–Y position determination, as is described in U.S. Pat. No. 5,117,071 and shown in FIG. 2B. The force sensing resistor 11 is the type used in membrane switch devices. The force sensing resistor 11 meets with a small circular printed circuit board 10 which is used to make appropriate contact with the force sensing resistor 11.

The force sensing resistor 11 generates a variable resistance which depends on the pressure applied to it by the tip. The force sensing resistor 11 can be biased by a reference voltage source for example 1.4 volts, so that a differential voltage across the device can be amplified by the operational amplifier 40. The output voltage can be adjusted to match the output voltage for the range of X–Y positioning of the amplifier 30 for the electrostatic pickup device 29. In this way, a common analog-to-digital conversion circuit could be used to digitize both the pressure output by the pressure detector 42 and the signal strength output by the signal strength detector 32 in FIG. 1. In such an alternate embodiment, appropriate switching between the pressure detector 42 and the signal detector 32 with the single analog-to-digital converter could be accomplished to perform an analog multiplexing of the analog signal input to the common analog-to-digital converter. Item 8 in FIG. 2A is a bushing to maintain the tip 4 in concentric alignment with the cone 3 attached to the tubing 2 of the stylus 20. The separator 5 shown in FIG. 2A can be used to separate the pressure detecting electronics 42 from the signal strength detecting electronics 32 in the stylus 20. The end 7 opposite from the tip 4 for the stylus 20 shown in FIG. 2, can optionally hold an optical input for optical character recognition or an optical input for bar code detection. Alternately, the end 7 can hold a liquid crystal display which will present a visual output to the user.

In another embodiment of the invention, the storage device 76 can be a read-only storage such as 104 in FIG. 3, which stores a personal identification number or a password or other security information, which can be transmitted from the stylus 20 to the digitizing display 22, for processing in the pen-based computer 74, to validate the stylus or the user of the stylus.

Figure 5:
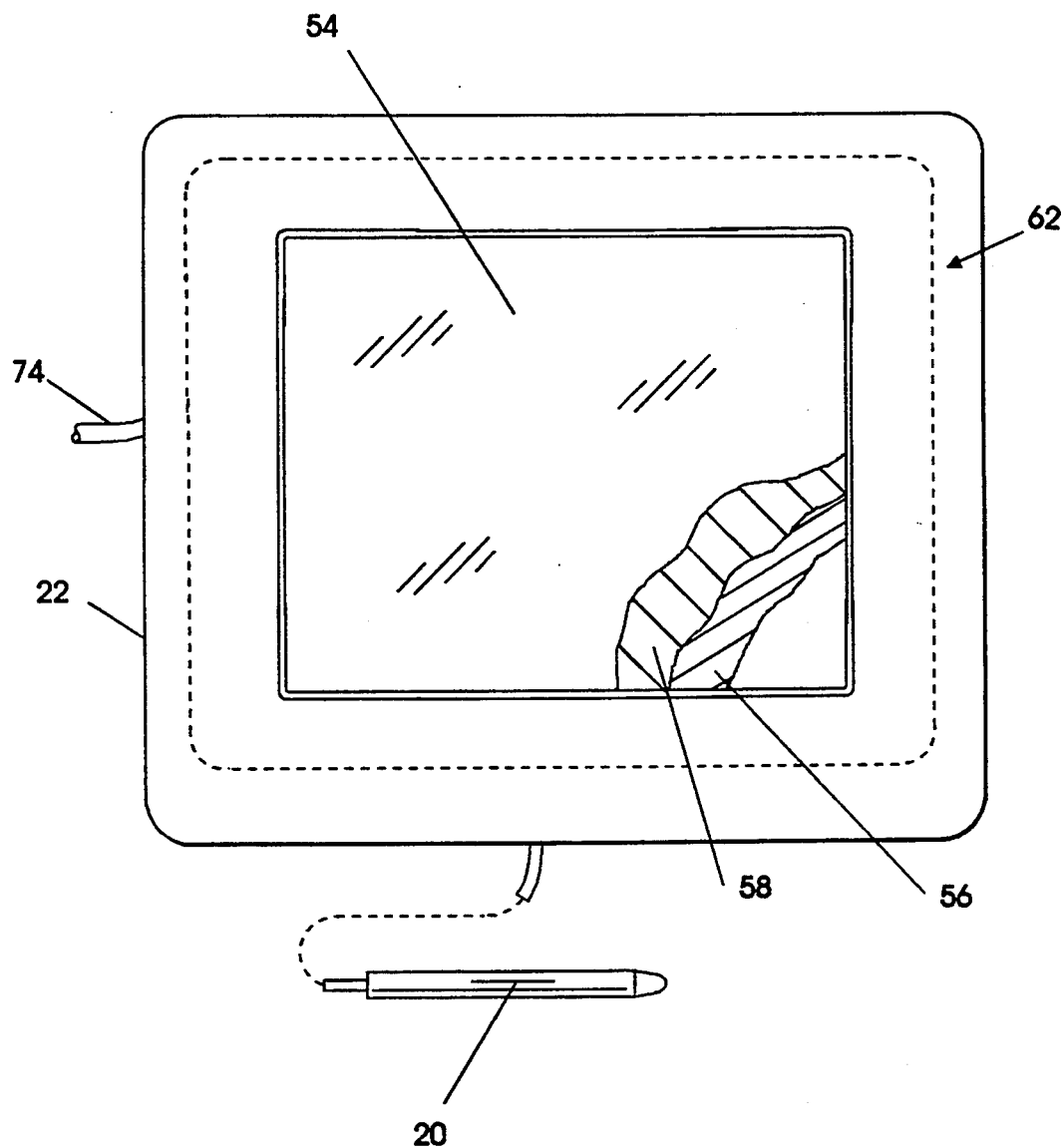

FIG. 5 shows a more detailed view of the workpad embodiment of the tablet or digitizing display 22 and the associated pickup stylus 20. FIG. 6 is a side view of the workpad 22. FIG. 5 and FIG. 6 show the relative location of the embedded antenna 62 within the housing of the workpad 22. It can be seen how the electrostatic tablet 54 with its horizontal and vertical conductors 56 and 58 are positioned in relation to the antenna 62. The wire 74 connects the workpad 22 to the pen-based computing system.

Figure 7:
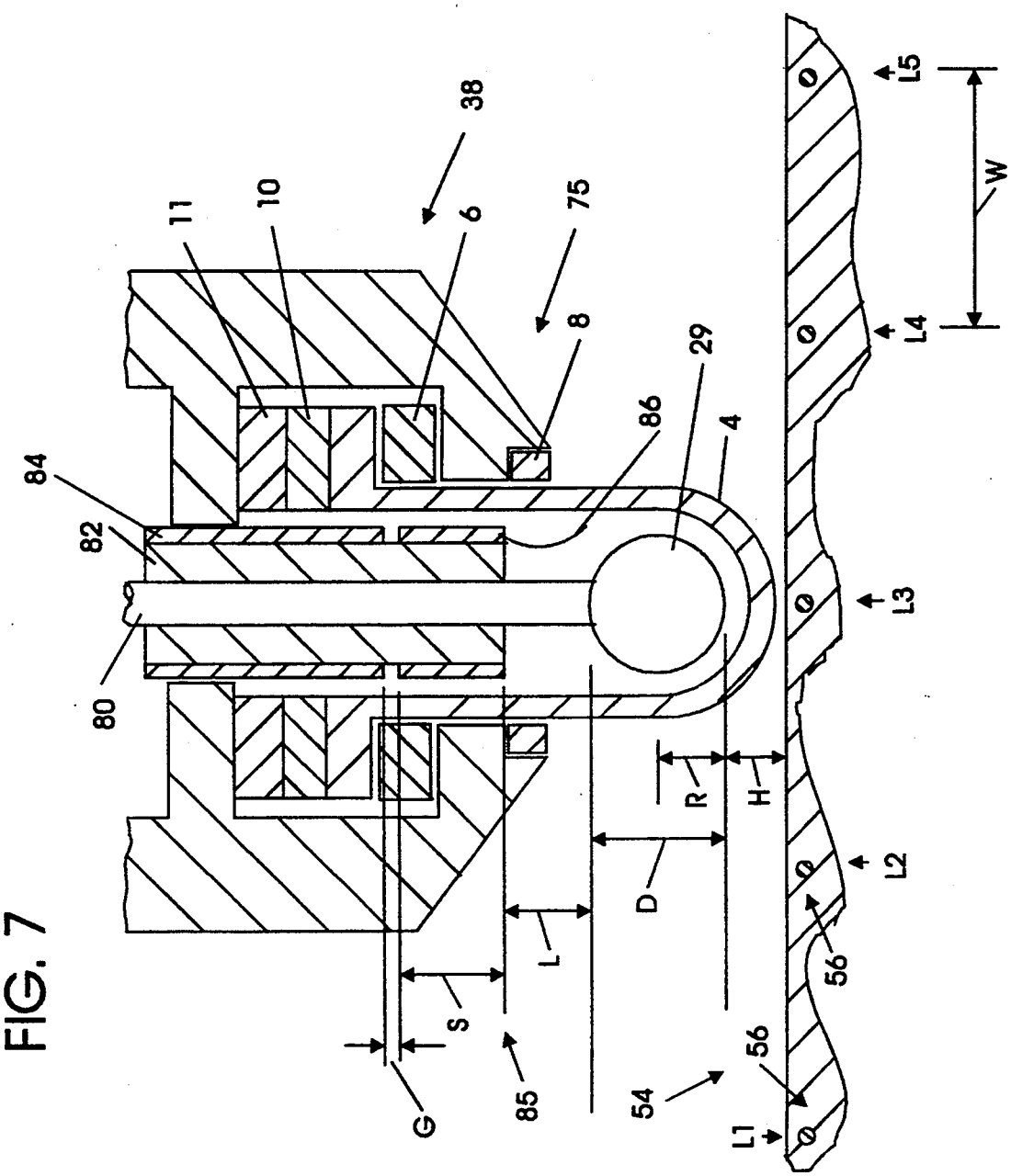
FIG. 7 is a detailed cross-sectional view of the stylus tilt 38 for the stylus, showing the feature of the coaxial conductor assembly for providing tilt orientation sensitivity.

FIG. 7 shows a side cross-sectional view of the tip 38 for the stylus 20, showing in particular the construction of the coaxial conductor assembly. FIG. 8 shows a side view of the coaxial conductor assembly, and its electrical connection to the tip switch 88. The radiative pickup stylus 20 for the digitizing display 54, has a tilt orientation sensitivity feature, in accordance with the invention. The stylus housing 20 has a hollow tip portion 38 for mechanically supporting the coaxial conductor assembly 75 shown in FIG. 7.

The coaxial conductor assembly 75 mounted in the tip 38 of the housing 20, has a central conductor 80 surrounded by an insulating sleeve 82 with an external cylindrical surface. The central conductor 80 has an end extending axially beyond a terminating surface 85 of the sleeve 82. The coaxial conductor assembly 75 includes a first hollow, cylindrical conductor 84 which is supported on the external surface of the insulating sleeve 82 and which is electrically connected to a reference potential such as ground potential, as is shown in FIG. 8. The coaxial conductor assembly 75 further includes a second hollow, cylindrical conductor 86 which is supported on the external surface of the insulating sleeve 82 as is shown in FIG. 7, in spaced relation, to the first hollow, cylindrical conductor 84. The space between the two conductors is shown as G in FIG. 7 and can have a value of 0.005 inches for example. The diameter of the cylindrical insulating sleeve can be for example 0.062 inches and the wall thickness of the coaxial conductor 84 and the coaxial conductor 86 can be for example 0.006 inches.

The second hollow, cylindrical conductor 86 is positioned nearer to the terminating surface 85 of the sleeve 82 than is the first hollow, cylindrical conductor 84. The coaxial conductor assembly 75 includes the spherical terminal electrode 29 mounted to the end of the central conductor 80 and in space relation to the second hollow, cylindrical conductor 86. The distance L from the proximate end of the second conductor 86 to the nearest portion of the spherical surface of the electrode 29 can be for example 0.045 inches. The axial length of the second hollow, cylindrical conductor 86 can be for example 0.050 inches. The radius of the sphere for the spherical terminal electrode 29 can be 0.031 inches for example. The separation distance W between adjacent electrodes 56 in the tablet or digitizing display is 0.125 inches, in this example.

In accordance with the invention, two measurement states can be provided for the coaxial conductor assembly 75. The first measurement state enables the spherical terminal electrode to detect the electromagnetic signal radiated from the digitizing display 54 to establish a first location for the tip 38. In the second state, the second hollow, cylindrical conductor 86 will be used to measure the relative distance from the plane of the digitizing display 54, to provide a measure of the tilt orientation for the stylus 20.

In accordance with the invention, in the first detection state, with the tip switch 88 shown in FIG. 8, the switch electrode 90 for the cylindrical electrode 86 is connected to ground potential 94 while the spherical terminal electrode 29 is connected through switch element 92 to the detection amplifier 30 terminal 96. The spherical electrode 29 thus serves as the pickup antenna for the electromagnetic signal radiated from the tablet or digitizing display 54. In this first detection state, the second hollow, cylindrical conductor 86 is connected to the reference potential of ground and the spherical terminal electrode 29 is connected to the radiative field detector 30, to measure a first distance H of the spherical terminal electrode from the plane of the digitizing display 54 radiating an electromagnetic signal.

Further in accordance with the invention, in the second detection state, the spherical terminal electrode 29 is connected to ground potential through the switch element 92 to the terminal 98 as shown in FIG. 8, and correspondingly the cylindrical conductor 86 is connected through the switch element 90 to the terminal 96 which connects to the detection amplifier 30. In this manner, the centroid of the cylindrical conductor 86 serves as the charge center for the location which is attributed to the electrode 86, with respect to the electromagnetic signal being radiated from the digitizing display 54. In this second detection state, the second hollow, cylindrical conductor 86 is connected to the radiative field detector 30 and the spherical terminal electrode 29 is connected to the reference potential of ground, to measure the tilt orientation value of the coaxial conductor assembly with respect to the plane of the digitizing display 54. In this manner, an improved technique is provided for measuring the tilt orientation of the stylus 20 with respect to the plane of digitizing display 54.

By calibrating the coaxial conductor assembly with the mechanical contact information provided by the pressure detector 42, an accurate position coordinate and tilt orientation value can be measured for the stylus at other locations and other orientations relative to the plane of the digitizing display FIG. 2A shows a cross-sectional view of the stylus 20 and in particular shows the tip 38 which is placed in proximity to the digitizing display 54. FIG. 2B is a more detailed illustration of the assembly in FIG. 2A, and shows in particular the combination of the spherical antenna 29 connected to the switch 88 and the cylindrical antenna 86 also connected to the switch 88. As can be seen, the output of the switch 88 is connected to the input of the amplifier 30.

FIG. 4 is a timing diagram showing the multiplexed sequence of information packets A1, B, C1 and D1 which are transmitted during a first time frame before the time T1. The packet B comes from the spherical antenna 29 by virtue of a prior setting of the tip switch 88. At the time T1, the signal J is received on the receiver 52 and is passed through the multiplexer 36' to the tip switch 88, switching its state so that the cylindrical antenna 86 is now connected. Following the time T2 in FIG. 4, a second frame of digital packets are transmitted by the transmitter 46 in the sequence of A2, B*, C2 and D2. B* is the measurement information received from the cylindrical antenna 86 through the tip switch 88.

FIG. 7 shows the digitizing display 54 in cross-sectional view and it can be seen that there are five radiative lines 56 embedded in the digitizing display 54, in particular lines L1, L2, L3, L4 and L5. The mutual separation distance between adjacent lines L4 and L5, for example, is the magnitude W. In the example lines 56 shown herein, the magnitude W is 0.125 inches and the frequency of their radiation in 40K Hertz.

For optimum results, the spherical terminal 29 has a diameter less than the magnitude W. The diameter of the cylindrical conductor 86 is also less than the magnitude W, for optimum results.

Figure 9A:
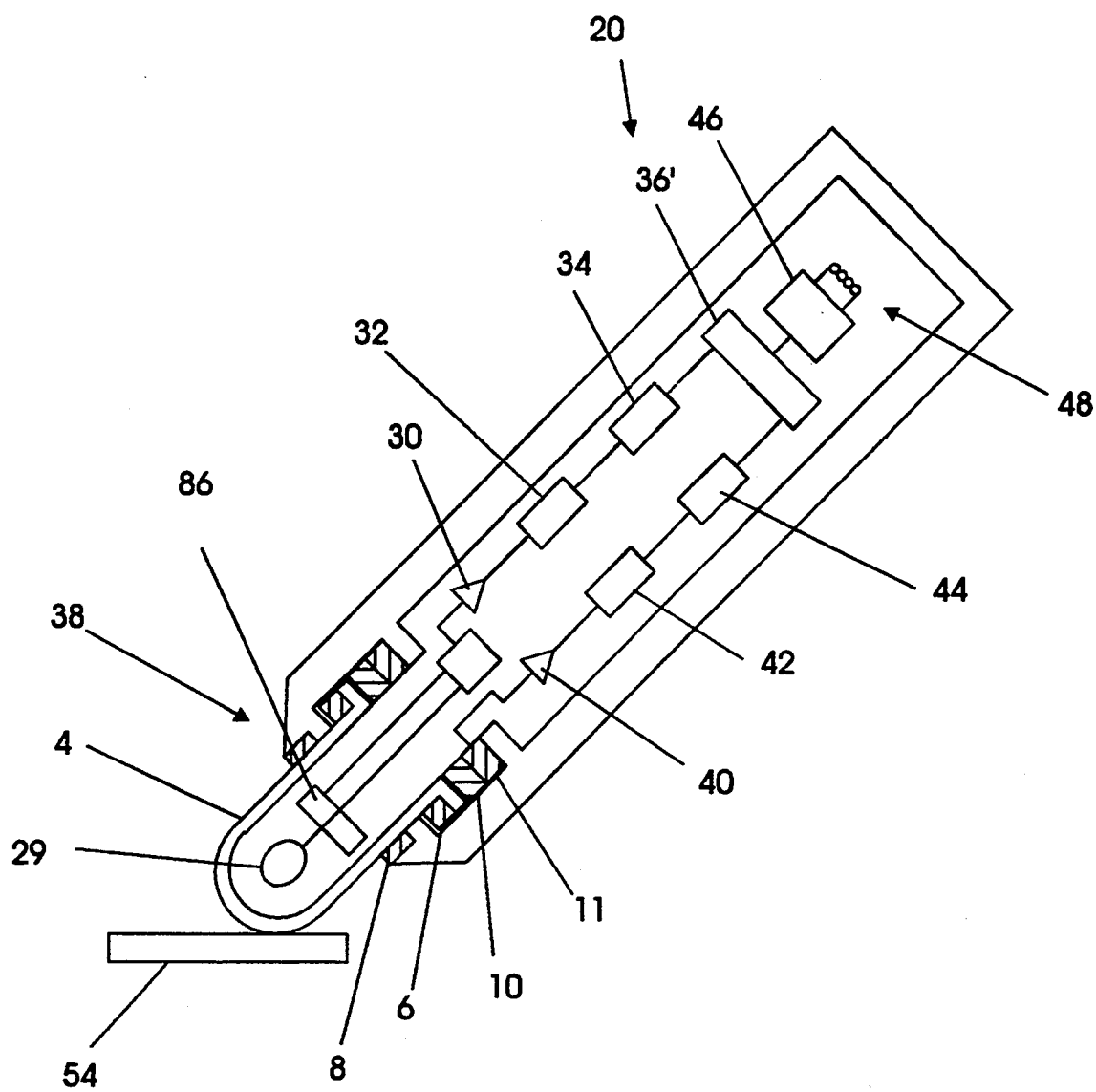
FIG. 9 shows an orientation of a stylus during its normal use, at a tilt angle.
FIG. 9B is a cross-sectional view of the stylus of FIG. 9A.
FIG. 9C shows an alternate arrangement for establishing calibration value for a stylus.

FIG. 9A shows the orientation of the stylus 20 during its normal use, at a tilt angle. The tilt angle is defined as the angle between the axis of the cylindrical housing 20 and the plane of the digitizing display 54, in a plane which is perpendicular to the plane of the digitizing display 54 and through which passes the axis of the cylindrical housing 20. FIG. 9A also shows a typical orientation of the stylus 20 during a first phase of calibration as will be described in connection with FIG. 10A.

Figure 9B:
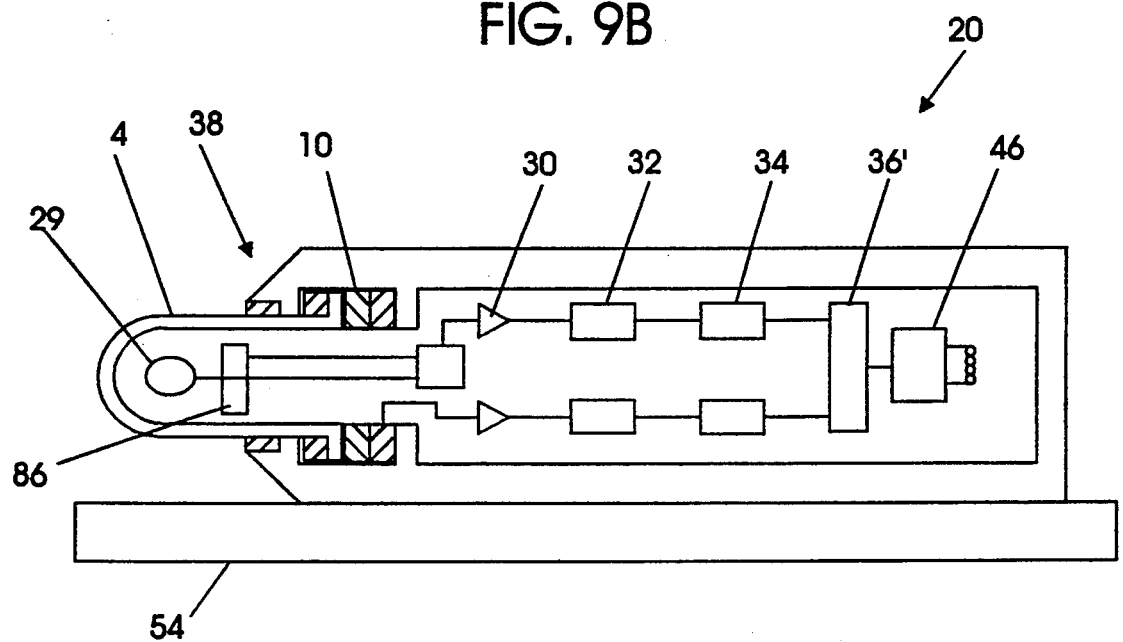

FIG. 9B is a side cross-sectional view of the stylus 20 shown laying down on its side on the surface of the digitizing display 54, so that the cylindrical axis of the stylus 20 is substantially parallel with the plane of the digitizing display 54. This orientation corresponds to the second phase of calibration as will be described in connection with FIG. 10A.

Figure 9C:
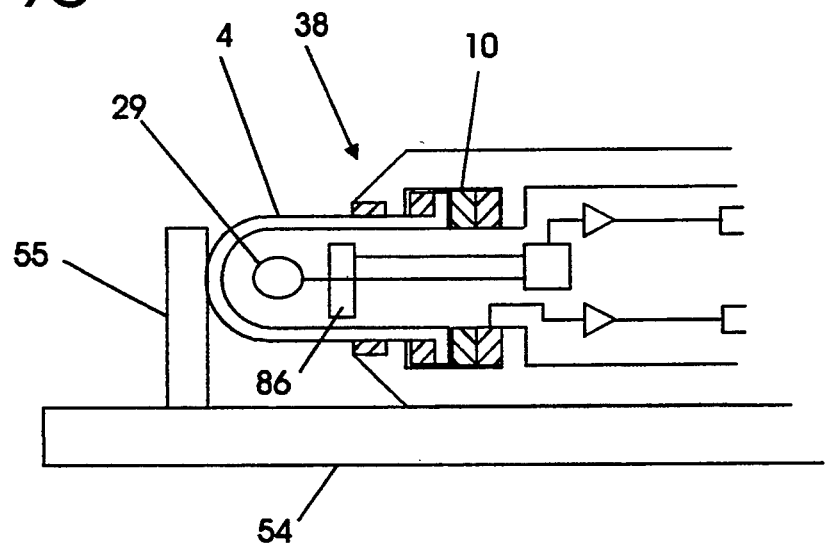

FIG. 9C shows an alternate arrangement for establishing calibration values for the stylus and in particular shows applying the tip 4 of the end 38 against a vertical pillar 55 mounted perpendicularly to the plane of the digitizing display 54.

Figure 10A:
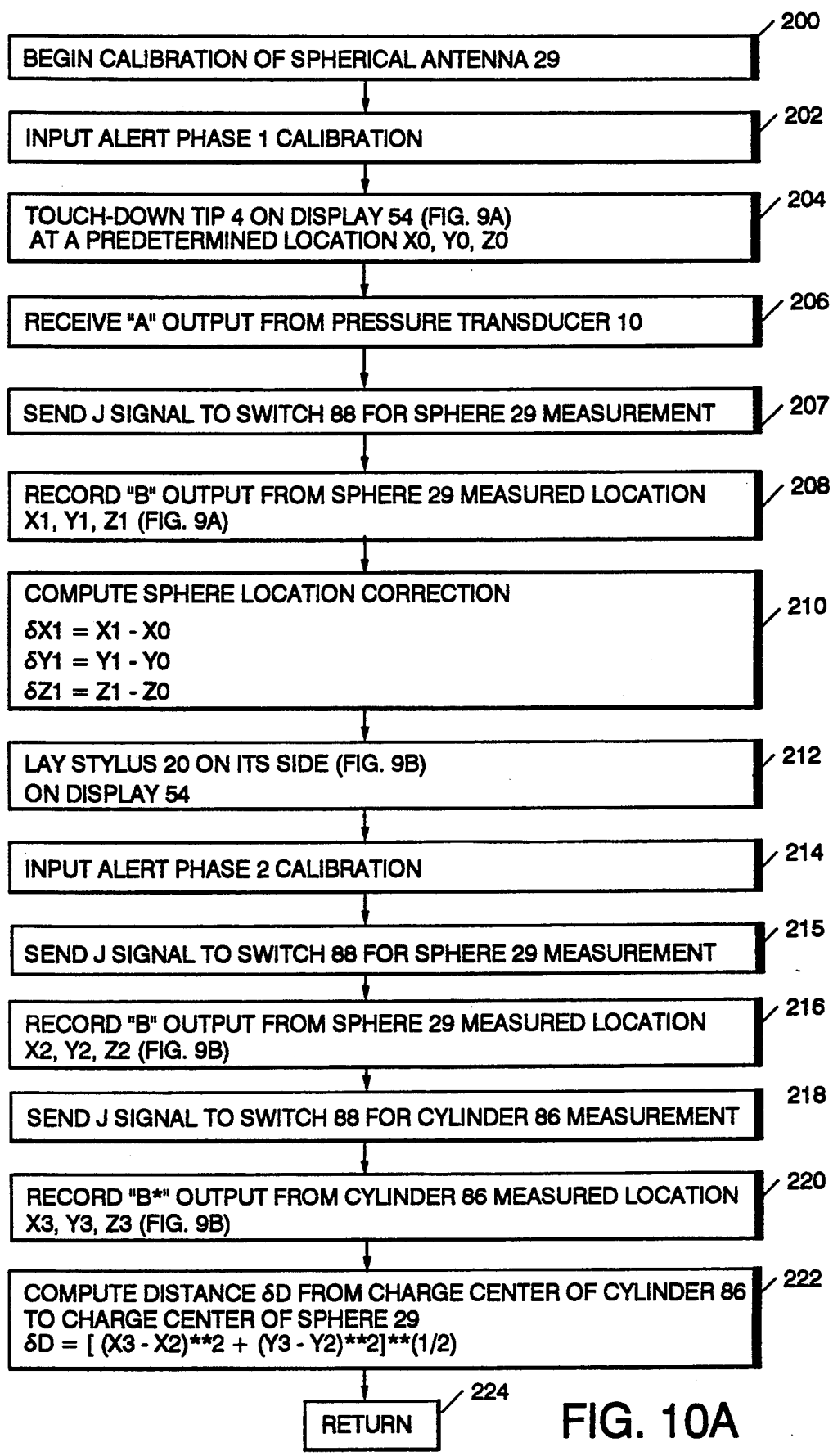
FIG. 10A is a flow diagram of sequence of operational steps carried out in a computer program running in a microprocessor 68 shown in FIG. 1 for calibrating the stylus of FIG. 9A.

FIG. 10A is a flow diagram of a sequence of operational steps which can be carried out in a computer program running in the microprocessor 68 of FIG. 1 or in the pen-based personal computer 74 of FIG. 1B connected to the microprocessor 68. FIG. 10A is a calibration method for the stylus 20, enabling the calibration of both positional coordinates X0,Y0,Z0 and the tilt angle T with respect to the plane of the digitizing display 54.

The calibration method in the flow diagram of FIG. 10A begins with step 200, which begins the calibration of the sphere 29. Step 202 has the user input an alert signal, perhaps from the keyboard of the personal computer 74, which will initialize the phase 1 of calibration. Then step 204 has the user touch down the tip 4 on the digitizing display 54 such as is shown in FIG. 9A, at a predetermined location on the digitizing display which has the coordinates X0,Y0,Z0.

Since the tip 4 is in mechanical contact with the digitizing display 54, the pressure detector 42 and A-to-D converter 44 output a signal A to the multiplexer 36' which transmits it over the transmitter 46 and the antenna 48 to the data antenna 62 of the electrostatic tablet 22. Step 206 receives the A output from the pressure transducer 10. Then in response, step 207 sends the J signal to the switch 88 by virtue of transmission from the data antenna 62 and the tablet 22 to the antenna 48 and the receiver 52 in the stylus 20. The J signal passes through the multiplexer 36' to the tip switch 88 and sets it so as to connect the sphere 29 to the amplifier 30.

Then step 208 in FIG. 10A records the B output from the sphere 29 which is a measured location X1,Y1,Z1 for the centroid of the sphere 29 as is shown in FIG. 9A. This information is transmitted via the antenna 48 to the data antenna 62 of the tablet 22 and is received in the microprocessor 68 and can be passed on to the pen-based computing system 74. Then in step 210, a computation is made of the location correction for the sphere 29. The value delta X1 is the error in the location along the X coordinate, the value delta Y1 is the error in the location along the Y coordinate and the value delta Z1 is the error in the location along the Z coordinate for the spherical antenna 29 with respect to the predetermined location X0,Y0,Z0.

Delta X1=X1−X0
Delta Y1=Y1−Y0
Delta Z1=Z1−Z0

Then in step 212, the user lays the stylus 20 on its side on the upper surface of the display 54, as is shown in FIG. 9B. This will position the cylindrical axis for the cylindrical housing of the stylus 20 parallel with the plane of the digitizing display 54. Then in step 214, the user inputs a second alert signal, for example through the keyboard of the personal computer 74, and this signifies the beginning of phase 2 for the calibration. Then in step 215 of FIG. 10A, after the user inputs the alert signal in step 214, the J signal is transmitted from the data antenna of 62 of the tablet 22 to the stylus 20 to pass through the multiplexer 36' to the tip switch 88, switching the tip switch into the first state where it connects the sphere 29 to the amplifier 30. This step is performed to insure that the appropriate connection from the sphere 29 to the amplifier 30 is maintained for the beginning of the phase 2 calibration sequence. Then, in step 216, the B signal output from the sphere 29 is recorded, for the measured location X2,Y2,Z2 of the centroid of the sphere 29.

Then in step 218, the antenna 62 of the tablet 22 transmits the J signal to the tip switch 88 to change the state of the switch 88 into the second state, to connect the cylinder 86 to the amplifier 30. Then in step 220, the data packet B* is output from the cylindrical antenna 86 and is transmitted through the amplifier 30 and A-to-D converter 34 and through the multiplexer 36' and the transmitter 46 to the data antenna 62 of the tablet 22. The output B* is recorded for the cylindrical antenna 86 at a measured location X3,Y3,Z3 of the centroid of the cylinder 86.

Then, in step 222, the microprocessor 68 or the personal computer 74 connected thereto, computes the distance delta D from the charge center of the cylinder 86, which is typically its centroid, to the charge center of the sphere 29, which is typically its centroid. This distance delta D is computed as the following expression.

$$Delta\ D=[(X3-X2)2+(Y3-Y2)2]**(\tfrac{1}{2})]$$

Then the calibration program of FIG. 10A flows to step 224 which returns to the main program running in either the microprocessor 68 or in the pen-based personal computer 74 connected thereto.

Figure 10B:
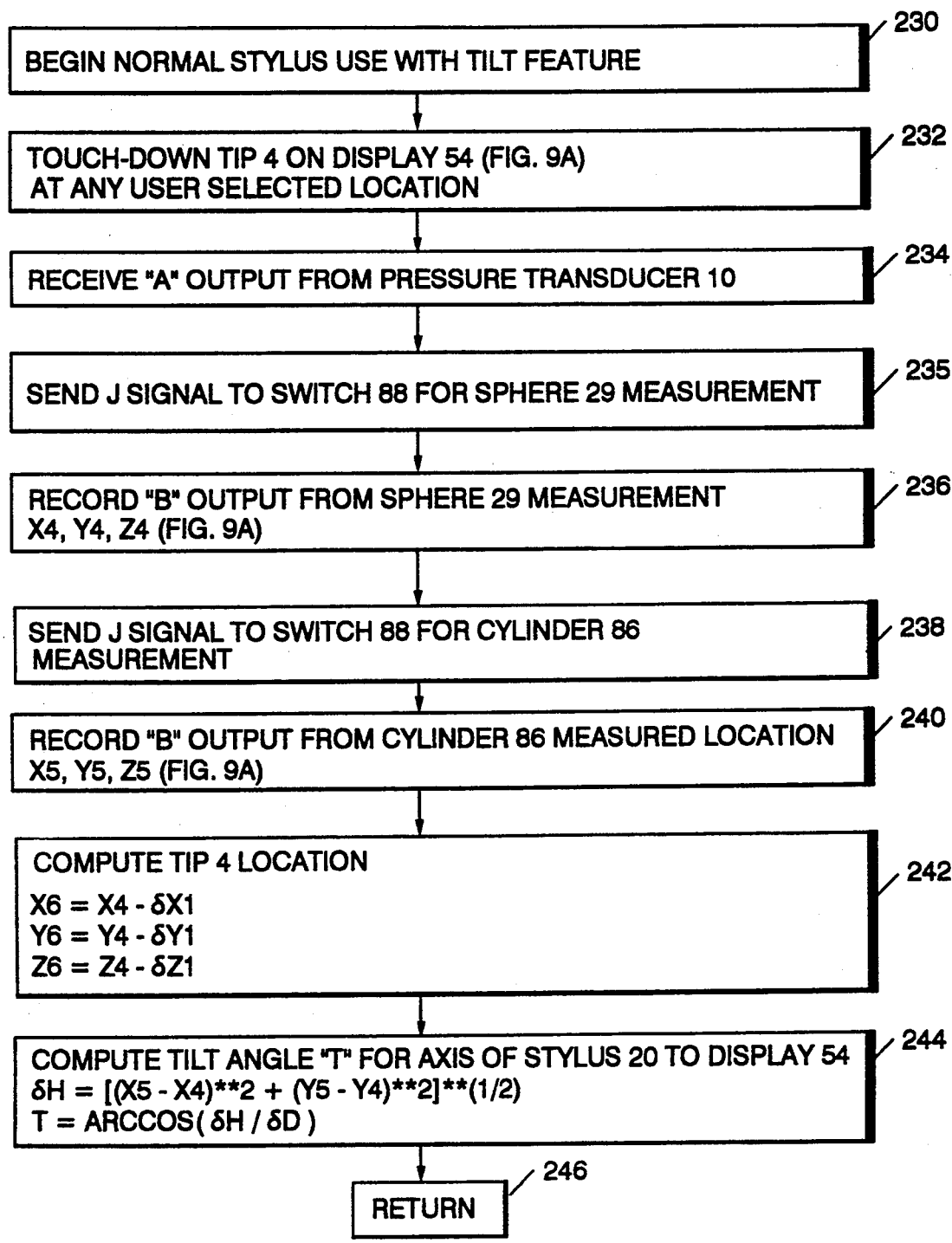
FIG. 10B is a flow diagram which shows a sequence of operational steps carried out in a computer program running in a microprocessor to measure both the location of a stylus tip and the relative tilt of a stylus with respect to a digitizing display.

During normal operation of the stylus 20 in conjunction with the digitizing display 54, when it is desired to measure both the location of the tip 4 and the relative tilt orientation of the stylus 20 with respect to the plane of the digitizing display 54, the sequence of operational steps shown in FIG. 10B is carried out. These steps are embodied in a sequence of instructions in a computer program residing in either the microprocessor 68 or alternately in the pen-based personal computer 74 connected thereto.

The flow diagram of. FIG. 10B begins with step 230 which begins the normal stylus use with the tilt feature. Then in step 232, the user touches down the tip 4 on the surface of the display 54, as is shown in FIG. 9A. Then in step 234, the A signal is received from the pressure detector 42 for the pressure transducer 10. Then in step 234, in response to receiving the A signal from a touch down of the tip 4, a J signal is sent from the tablet 22 to the stylus 20 to switch the state of the switch 88 to connected the spherical antenna 29 to the amplifier 30 for a tip location measurement. Then in step 236, the B data packet is output from the spherical antenna 29 and the coordinates X4,Y4,Z4 are recorded for the measured location of the centroid of the spherical antenna 29.

In response to this, step 238 sends the J signal from the tablet 22 to the stylus 20 to switch the state of the tip switch 88 in order to connect the cylindrical antenna 86 to the amplifier 30. Then in step 240, the B* output from the cylindrical antenna 86 is received from the stylus 20 by the tablet 22, and the coordinates for the location of the centroid of the cylinder 86 of X5,Y5,Z5 are recorded.

Then, step 242 of the flow diagram of FIG. 10B performs the computation of the tip location for the tip 4. The tip location coordinates are X6,Y6,Z6.

X6=X4−delta X1
Y6=Y4−delta Y1
Z6=Z4−delta Z1

This computation for the location of the tip 4 of the stylus 20 has been corrected for the offset of the centroid of the spherical antenna 29 with respect to the contact point for the tip, as determined by the calibration steps carried out in the flow diagram of FIG. 10A.

Then in step 244 of FIG. 10B, the tilt angle T is computed for the orientation of the cylindrical axis of the stylus 20 with respect to the plane of the digitizing display 54. The tilt angle T is computed from the horizontal projection of the cylindrical axis for the stylus onto the plane of the digitizing display 54. The horizontal projection has a magnitude of delta H.

$$Delta\ H=[(X5-X4)2+(Y5-Y4)2]**(\tfrac{1}{2})]$$

Then the tilt angle T is computed as the arc cosine of the projection of the cylindrical axis onto the plane of the digitizing display, taken with respect to the value delta D for the computed distance between the centroid of the cylinder and the centroid of the sphere as was computed in the calibration flow diagram of FIG. 10A. The computation for the tilt angle T is:

$$T=ARCCOS(delta\ H/delta\ D)$$

These computations for the coordinates of the touch down point of the tip 4 on the surface of the digitizing display 54 and of X6,Y6,Z6, and the computation for the tilt angle T of the cylindrical axis for the stylus with respect to the plane of the digitizing display, are then utilized by the application program in the pen-based computer 74 for its intended purpose. Example applications can be for signature verification, the inscription of calligraphy such as Kanji painted characters, and other applications where the tilt orientation of the stylus is meaningful for a particular application.

Although specific embodiments of the invention have been disclosed, it will be understood by those having skill in the art that changes can be made to those specific embodiments without departing from the spirit and the scope of the invention.

What is claimed is:

1. A radiative pickup stylus for a digitizing display, having a tilt orientation sensitivity, comprising:
    a stylus housing having a hollow tip portion for mechanically supporting a coaxial conductor assembly;
    a coaxial conductor assembly mounted in said hollow tip portion of said stylus housing having a central conductor surrounded by a hollow, cylindrical conductor, for measuring the tilt of said stylus housing with respect to a digitizing display;
    said coaxial conductor assembly further including spherical terminal electrode mounted to an end of said central conductor and in spaced relation to said hollow, cylindrical conductor, for measuring the distance of said stylus housing from said digitizing display;
    said hollow tip portion of said stylus housing further including a mechanical contact sensor having an envelope portion which encases said coaxial conductor assembly, for mechanically contacting said digitizing display; and calibration means coupled to said mechanical contact sensor and to said spherical termination electrode and to said hollow, cylindrical conductor, for calibrating said tilt measurement in said distance measurement.

2. In a data processing system including a radiative pickup stylus for a digitizing display, having a tilt orientation sensitivity, said radiative pickup stylus including a stylus housing having a coaxial conductor assembly including a spherical terminal electrode to measure with a radiative pickup detector a distance from a digitizing display radiating an electromagnetic signal, and a hollow, cylindrical conductor to measure with said detector, a tilt orientation value of said coaxial conductor assembly with respect to the plane of said digitizing display, said stylus housing further including a mechanical contact sensor having an envelope portion which encases said coaxial conductor assembly, for mechanically contacting said digitizing display, a method for calibrating said radiative pickup stylus, comprising the steps of:

measuring a first radiative pickup signal strength with said spherical terminal electrode while mechanically contacting said digitizing display with said envelope portion of said insert mechanical contact sensor;

measuring a second radiative pickup signal strength with said cylindrical conductor, while maintaining a predetermined tilt orientation of said stylus housing with respect to said digitizing display and adjusting said radiative field detector in response to said first and second radiative pickup signal strengths.

3. A radiative pickup stylus for a digitizing display, having a tilt orientation sensitivity, comprising:

a stylus housing having a hollow tip portion for mechanically supporting a coaxial conductor assembly:

a coaxial conductor assembly mounted in said hollow tip portion of said housing having a central conductor surrounded by an insulating sleeve with an external, cylindrical surface, said central conductor having an end extending axially beyond a terminating surface of said insulating sleeve;

said coaxial conductor assembly including a first hollow, cylindrical conductor portion supported on an external surface of said insulating sleeve and electrically connected to a reference potential;

said coaxial conductor assembly further including a second hollow, cylindrical conductor portion supported on said external surface of said insulating sleeve in spaced relation to said first hollow, cylindrical conductor and nearer to said terminating surface of said insulating sleeve than said first hollow, cylindrical conductor;

said coaxial conductor assembly further including spherical terminal electrode mounted to said end of said central conductor and in spaced relation to said second hollow, cylindrical conductor;

said second hollow, cylindrical conductor being connected to said reference potential and said spherical terminal electrode being connected to a radiative field detector in a first detection state, to measure a first distance of said spherical terminal electrode from a plane of digitizing display radiating an electromagnetic signal; and said second hollow, cylindrical conductor being connected to said radiative field detector and said spherical terminal electrode being connected to said reference potential in a second detection state, to measure a tilt orientation value of said coaxial conductor assembly with respect to the plane of said digitizing display.

4. The radiative pickup stylus for a digitizing display, having a tilt orientation sensitivity of claim 3, which further comprises:

said digitizing display having a plurality of radiating electrodes embedded therein for radiating said electromagnetic signal;

said radiating electrodes having a periodic separation distance of magnitude W;

said spherical terminal electrode having a diameter magnitude of less than or approximately equal to said magnitude W; and said second hollow, cylindrical conductor having a diameter magnitude of less than or approximately equal to said magnitude W.

5. The radiative pickup stylus for a digitizing display, having a tilt orientation sensitivity of claim 3, which further comprises:

said hollow tip portion of said stylus housing further including a mechanical contact sensor having an envelope portion which encases said coaxial conductor assembly, for mechanically contacting said digitizing display; and calibration means coupled to said mechanical contact sensor and to said spherical termination electrode and to said second hollow, cylindrical conductor, for calibrating said first detection state and said second detection state.

6. In a data processing system, a radiative pickup stylus for a digitizing display, having a tilt orientation sensitivity, comprising:

a stylus housing having a coaxial conductor assembly;

said coaxial conductor assembly mounted in a tip of said stylus housing having a central conductor surrounded by an insulating sleeve with an external, cylindrical surface;

said coaxial conductor assembly further including a hollow, cylindrical conductor portion supported on an external surface of said insulating sleeve, said coaxial conductor assembly further including spherical terminal electrode mounted to an end of said central conductor and in spaced relation, to said hollow, cylindrical conductor;

said hollow, cylindrical conductor being connected to a reference potential and said spherical terminal electrode being connected to a radiative field detector in a first detection state, to measure a first distance of said spherical terminal electrode from a digitizing display radiating an electromagnetic signal; and said hollow, cylindrical conductor being connected to said radiative field detector and said spherical terminal electrode being connected to said reference potential in a second detection state, to measure a tilt orientation value of said coaxial conductor assembly with respect to the plane, of said digitizing display.

7. The radiative pickup stylus for a digitizing display, having a tilt orientation sensitivity of claim 6, which further comprises:

said hollow tip portion of said stylus housing further including a mechanical contact sensor having an envelope portion which encases said coaxial conductor assembly, for mechanically contacting said digitizing display; and calibration means coupled to said mechanical contact sensor and to said spherical termination electrode and to said hollow, cylindrical conductor, for calibrating said first detection state and said second detection state.

8. The radiative pickup stylus for a digitizing display, having a tilt orientation sensitivity of claim 6, which further comprises:
    said digitizing display having a plurality of radiating electrodes embedded therein for radiating said electromagnetic signal;
    said radiating electrodes having a periodic separation distance of magnitude W;
    said spherical terminal electrode having a diameter magnitude of less than or approximately equal to said magnitude W; and
    said hollow, cylindrical conductor having a diameter magnitude of less than or approximately equal to said magnitude W.

9. In a data processing system including a radiative pickup stylus for a digitizing display, having a tilt orientation sensitivity, said radiative pickup stylus including a stylus housing a coaxial conductor assembly including a hollow, cylindrical conductor selectively connected to a reference potential in a spherical terminal electrode connected to a radiative field detector in a first detection state, to measure a first distance of said spherical terminal electrode from a digitizing display radiating an electromagnetic signal, said hollow, cylindrical conductor selectively connected to said radiative field detector and said spherical terminal electrode connected to said reference potential in a second detection state, to measure a tilt orientation value of said coaxial conductor assembly with respect to the plane of said digitizing display, said stylus housing further including a mechanical contact sensor having an envelope portion which encases said coaxial conductor assembly, for mechanically contacting said digitizing display, a method for calibrating said first detection state and said second detection state, comprising the steps of:
    measuring a first radiative pickup signal strength in a first state, while mechanically contacting said digitizing display with said envelope portion of said mechanical contact sensor;
    measuring a second radiative pickup signal strength in a second state, while maintaining a predetermined tilt orientation of said stylus housing with respect to said digitizing display; and adjusting said radiative field detector in response to said first and second radiative pickup signal strengths.

10. The method of claim 9, which further comprises:
    said digitizing display radiating an electromagnetic signal from a plurality of radiating electrodes embedded therein for radiating said electromagnetic signal, having a periodic separation distance of magnitude W;
    said spherical terminal electrode detecting said radiated electromagnetic signal with a diameter magnitude of less than or approximately equal to said magnitude W; and
    said hollow, cylindrical conductor detecting said radiated electromagnetic signal with a diameter magnitude of less than or approximately equal to said magnitude W.

* * * * *